United States Patent
Favor, III et al.

(10) Patent No.: US 11,197,472 B1
(45) Date of Patent: Dec. 14, 2021

(54) INSECT MONITOR

(71) Applicant: Bed Bug Solutions, LLC, Bayville, NJ (US)

(72) Inventors: Michael Favor, III, Bayville, NJ (US); Scott Soltis, Bayville, NJ (US)

( * ) Notice: Subject to any disclaimer, the term of this patent is extended or adjusted under 35 U.S.C. 154(b) by 169 days.

(21) Appl. No.: 16/421,596

(22) Filed: May 24, 2019

Related U.S. Application Data

(63) Continuation-in-part of application No. 12/769,708, filed on Apr. 29, 2010, now Pat. No. 8,316,578.

(51) Int. Cl.
*A01M 1/02* (2006.01)
*A01M 1/14* (2006.01)
*A01M 1/10* (2006.01)

(52) U.S. Cl.
CPC ............ *A01M 1/023* (2013.01); *A01M 1/026* (2013.01); *A01M 1/103* (2013.01); *A01M 1/14* (2013.01)

(58) Field of Classification Search
CPC ...... A01M 1/023; A01M 1/026; A01M 1/103; A01M 1/14; A01M 1/02; A01M 1/10
See application file for complete search history.

(56) References Cited

U.S. PATENT DOCUMENTS

| | | | |
|---|---|---|---|
| 5,513,465 A * | 5/1996 | Demarest | A01M 1/145 43/113 |
| 5,722,199 A * | 3/1998 | Demarest | A01M 1/145 43/113 |
| 6,653,971 B1 * | 11/2003 | Guice | A01M 1/026 342/22 |
| 8,316,578 B2 * | 11/2012 | Faham | A01M 1/14 43/123 |
| 2003/0000127 A1 * | 1/2003 | Smith | A01M 1/145 43/113 |
| 2013/0180162 A1 * | 7/2013 | Vasudeva | A01M 1/023 43/123 |

FOREIGN PATENT DOCUMENTS

| | | | | |
|---|---|---|---|---|
| GB | 2457103 A * | 8/2009 | ............ | A01M 1/023 |
| WO | WO-2018017982 A1 * | 1/2018 | ......... | A01M 1/2022 |
| WO | WO-2018019857 A1 * | 2/2018 | ............ | G01N 15/06 |

* cited by examiner

*Primary Examiner* — Kathleen I Alker

(74) *Attorney, Agent, or Firm* — Christopher J. Van Dam, PA; Chris Vandam

(57) ABSTRACT

An insect monitoring device and method of monitoring insects having a body with a slide out tray assembly. The tray assembly has a replaceable sheet assembly with an exposed adhesive surface. The tray assembly has an aperture through which insects may pass to encounter the adhesive surface. Spaced from the adhesive surface is a heating element to warm the interior of the monitoring device. A sheet assembly has a reflective side to reflect heat back onto the adhesive surface and an insulating side to increase efficiency. A sensor array images the adhesive surface and transmits images to a remote computer. Other sensors may also be present on the sensor array.

5 Claims, 5 Drawing Sheets

US 11,197,472 B1

INSECT MONITOR

BACKGROUND OF THE INVENTION

1. Field of the Invention

The present invention relates to indoor insect control, and more particularly, to a device to capture and monitor insects in furtherance of suppressing an insect infestation.

2. Description of the Related Art

Several designs for insect traps have been designed in the past. None of them, however, includes a trap that lures an insect with heat and optionally an attractant and then permanently captures many insects on a removable cartridge and is wireless connected to a network where the condition of the trap and individual insects can be imaged when an alert is triggered after an insect moves into the trap with a motion sensor, a vibration sensor and other insect sensing devices.

Applicant believes that the closest reference corresponds to U.S. Pat. No. 8,316,578 issued to Faham with overlapping inventorship to the present disclosure. However, it differs from the present invention because the Faham device did not contemplate the electronic integration with wireless, network based monitoring with a sensor array to aid in the rapid detection and identification of capture insects done remotely from the device.

Other patents describing the closest subject matter provide for a number of more or less complicated features that fail to solve the problem in an efficient and economical way. None of these patents suggest the novel features of the present invention.

A brief abstract of the technical disclosure in the specification and title are provided as well for the purposes of complying with 37 CFR 1.72 and are not intended to be used for interpreting or limiting the scope of the claims.

Without limiting the scope of the invention, a brief summary of some of the claimed embodiments of the invention is set forth below. Additional details of the summarized embodiments of the invention and/or additional embodiments of the invention may be found in the detailed description of the invention below.

SUMMARY OF THE INVENTION

It is one of the main objects of the present invention to provide an insect trap that captures insects, such as bed bugs, and senses the capture of those bug to facilitate remediation.

It is another object of this invention to provide a device to relay visual information about a captured insect to a remote observer to identify the type and quantity of captured insects without the need for manual removal from the trap.

It is still another object of the present invention to provide a an insect monitor that is energy efficient, pet safe, odorless and unobtrusive to deploy in residential, commercial or industrial settings while being nearly unnoticeable.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
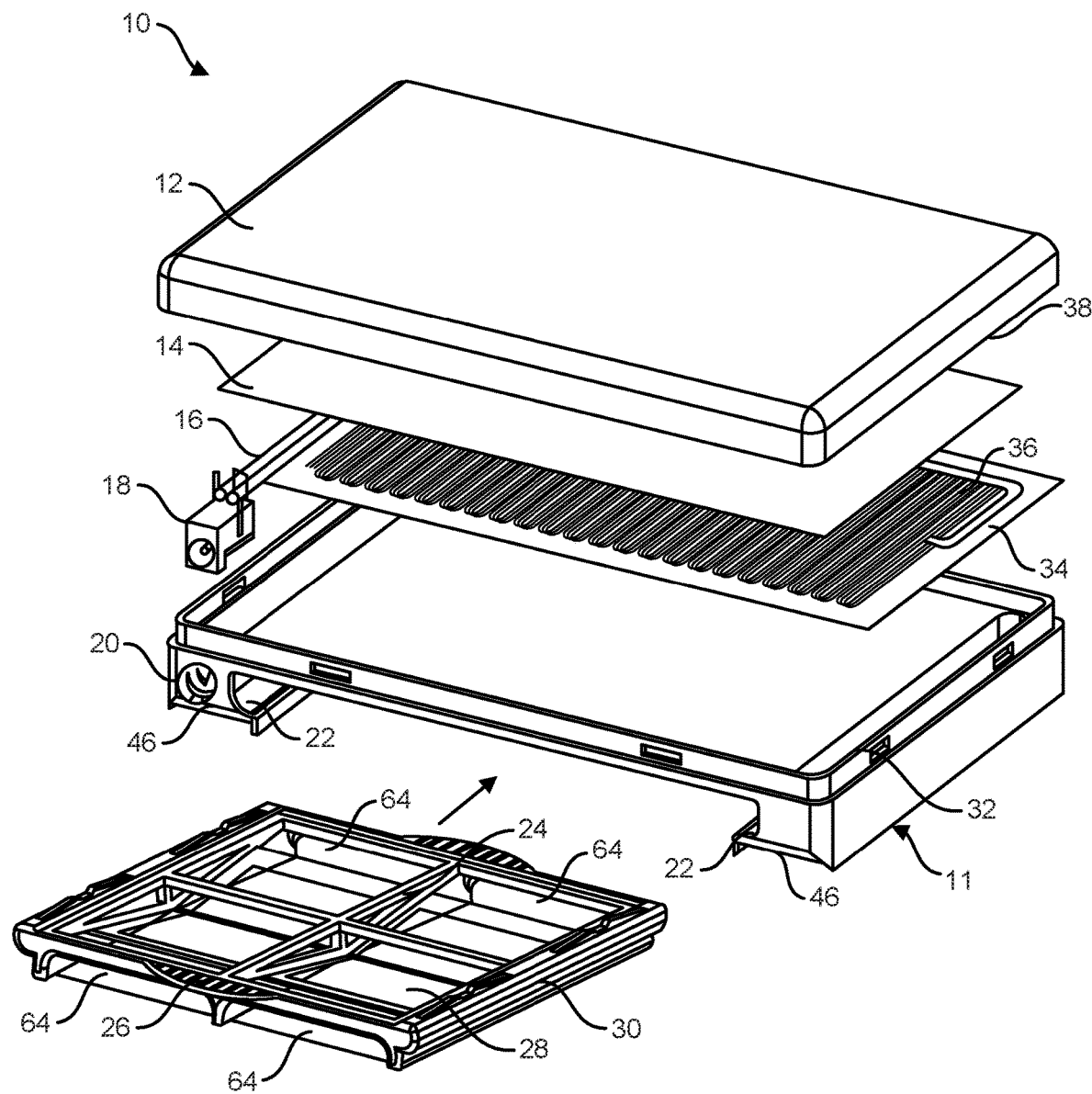
FIG. 1 shows a perspective exploded view of an insect monitor with cartridge.

While this invention may be embodied in many different forms, there are described in detail herein specific embodiments of the invention. This description is an exemplary of the principles of the invention and is not intended to limit the invention to the particular embodiments illustrated and described.

For the purpose of this disclosure, like reference numerals in the figures shall refer to like features unless otherwise indicated or is obvious by context.

The subject device and method of use is sometimes referred to as the device, the invention, the insect monitor, the insect trap, the monitoring device, the bed bug trap or monitor, the machine or other similar terms. These terms may be used interchangeably as context requires and from use the intent becomes apparent. The masculine can sometimes refer to the feminine and neuter and vice versa. The plural may include the singular and singular the plural as appropriate from a fair and reasonable interpretation in the situation.

Referring now to the drawings, where the present invention is generally referred to with numeral 10, it can be observed that it basically includes a body 11, a cover 12, a barrier assembly 14, a wire 16, a connector 18, an aperture 20, a track 22, a frame assembly 24, a handle 26, a sheet assembly 28, a tray assembly 30, a rim 32, a frame 34, a heating element 36, a rim 38, a plug 40, a cord 42, an adapter 44, feet 46, a frame 48, a truss 50, a surface 52, a margin 54, a rail 56, a support 58, a clip 60, a bottom 62, an aperture 64, a crease 66, an adhesive strip 68, a sheet 70, an insulator 72, a reflector 74, a zone 76, a zone 78, a zone 80, a sensor array 82, a camera 84, a vibration detector 86, a detector 88 and an antenna 90.

Looking at FIG. 1, an example of an insect trap and its various constituent parts is shown. The body 11 is provided as the main structure onto which the other parts are connected. Inside the body 11 is housed a heating element 36 and a barrier assembly 14. A cover 12 protects the heating element 36, barrier assembly 14 and related components inside the body 11.

The rim 38 of the cover 12 connects to the rim 32 of the body 11. The cover may be removable by unclipping the rim 38 from the rim 32. Alternatively the cover 12 may be permanently adhered to the rim 32 of the body 11.

Figure 8:
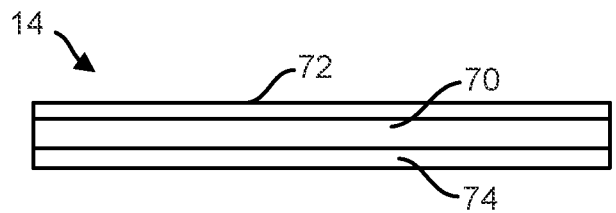
FIG. 8 shows an elevation cross section of a barrier assembly.

Covering the inside of the cover 12 is the barrier assembly 14. A detail of an example of a barrier assembly 14 is shown in detail in FIG. 8 and in context in FIG. 1. The barrier assembly 14 is formed around a sheet 70. The sheet is essentially a substrate onto which the insulator 72 and reflector 74 are attached. The relative proportions of the sheet 70, insulator 72 and reflector 74 are not shown in FIG. 8. FIG. 8 is merely to demonstrate the parts of the barrier assembly 14 and their relative location generally.

The insulator 72 layer is adhered to the sheet 70. The insulator 72 faces the inside of the cover 12. The insulator 72 has insulating characteristics and is adapted to prevent some of the heat generated by the heating element 36 from escaping the device through the cover. The insulator 72 layer can be any material that provides a barrier to heat loss through the cover 12. A layer of plastic, foam, fabric, flocking and other materials capable of providing at least some insulation value for the heating element 36.

The reflector 74 side of the sheet 70 is configured to reflect heat generated by the heating element 36 back towards the heating element 36 and the tray assembly 30 contained in the body 11. The reflector 74 may be constructed of a metal foil, metalized plastic or other material known to have the characteristic of reflecting or redirecting radiant heat in the desired direction toward the tray assembly 30.

The barrier assembly 14 keeps the inside of the body 11 warm enough to attract insects, such as bed bugs, with a minimal amount of energy expended. The majority of the heat generated by the heating element 36 is retained inside the device and the heat released is controlled so that heat is evenly emitted around the device as described in more detail below.

The sheet 70 may be rigid or flexible. The sheet 70 is generally dimensioned similar to the area of the insulator 72 and the reflector 74. In one version of the insect monitor device the sheet is plastic and is rigid enough to maintain the barrier assembly 14 in a flat, planar configuration and to be clipped or adhered to the underside of the cover 12. The barrier assembly 14 may be in direct contact with the heating element or there may be a protective air gap between the surface of the reflector 74 and the adjacent heating element 36.

Figure 2:
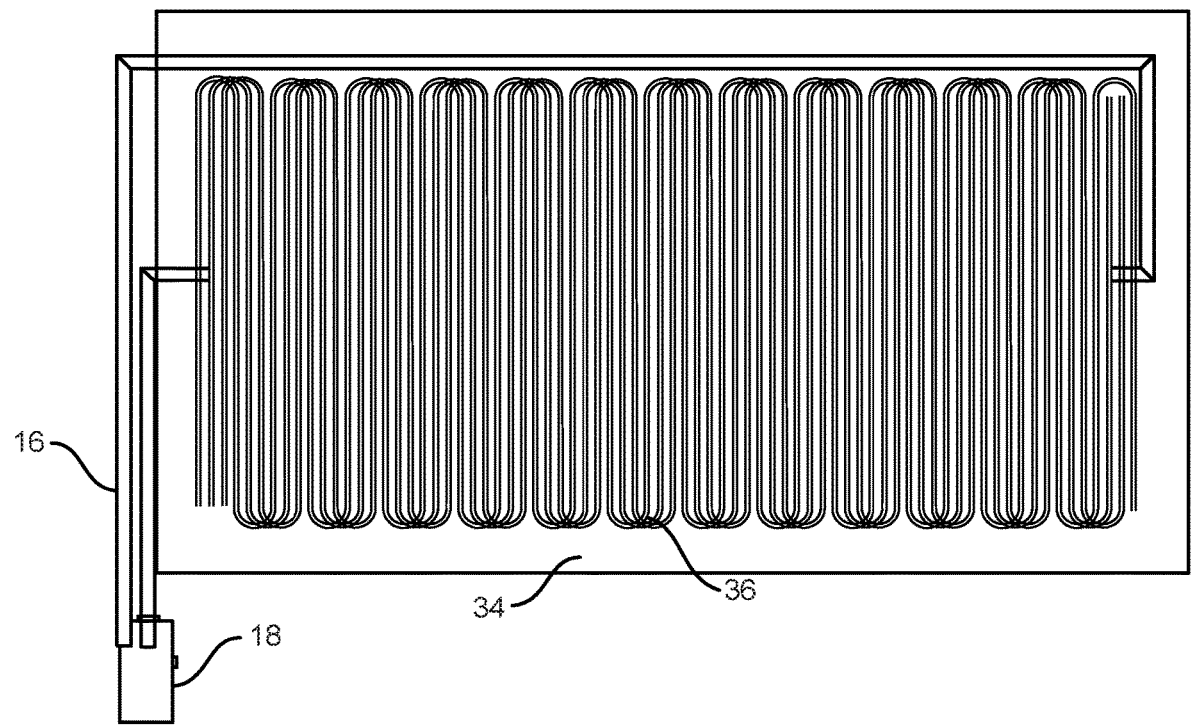
FIG. 2 shows a plan view of a heating element component of the insect monitor.

The heating element 36 is supported by a frame 34 as shown in FIGS. 1 and 2. The heating element 36 is able to convert electrical energy supplied by the wire 16 into heat energy. In one version of the invention the heating element is a resistance heating alloy, such as nichrome (NiCr alloys). Other resistance alloys such as CuNi, NiFe or FeCrAl may be employed as well as other alloys or available means to convert electricity into heat.

The frame 34, barrier assembly 14 and the inside of the cover 12 are generally all about the same size and fit within the cover 12 and body 11 while the device is in operation. The cover 12 and body 11 protect the heating element 36 from damage and also to prevent contact with environmental factors exterior of the insect monitor such as walls, pets and children.

Figure 3:
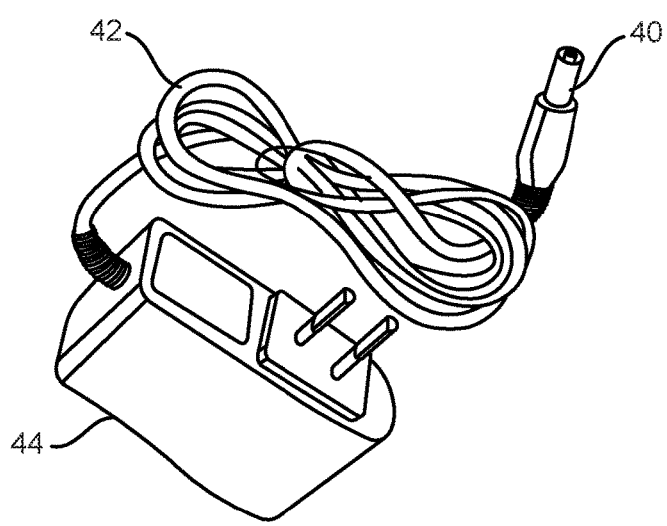
FIG. 3 shows a perspective view of an example of a power supply adapter component.

The heating element 36 is connected to an electrical supply at the connector 18. The connector 18 interfaces with the plug 40 on a direct current adapter 44, such as shown in FIG. 3. The length of the cord 42 is selected at manufacture to provide sufficient flexibility of locating the insect trap where needed even if not directly adjacent to a standard electrical outlet.

The adapter 44 may be provided that is capable of using an input current of 110-240 volts alternating current so that the device is operable with either type of system. This is particularly valuable for travelers who may encounter either standard without the need for additional power converters.

The cord 42 may also be useful to retrieve the insect trap. For example, if the insect trap is placed under a bed or other furniture during a monitoring session then the cord may be used to pull the trap when retrieving it for inspection or maintenance. The cord 42 may optionally contain an antenna to further extend the range of the wireless connection of the sensor array 82. In this configuration the cord 42 may include a non-powered additional wire that is electrically connected to the antenna 90 in the sensor array 82.

The connector 18 may be exposed through the body 11 at the aperture 20 so that the plug 40 can selectively be mated to the connector 18. Generally, this electrical connection will be required to power the heating element 36 and the sensor array 82 affixed onto or near the bottom side of the frame 34.

On a lower side of the body 11 are tracks 22 that receive the tray assembly 30. The tray assembly 30 is held in these tracks 22 to unify the tray assembly 30 and body 11 during typical operation of the insect monitor device. In one version of the device the tray assembly 30 is friction fit into the body 11 by sliding the rails 56 into the track 22 between the feet 46 of the device.

Figure 4:
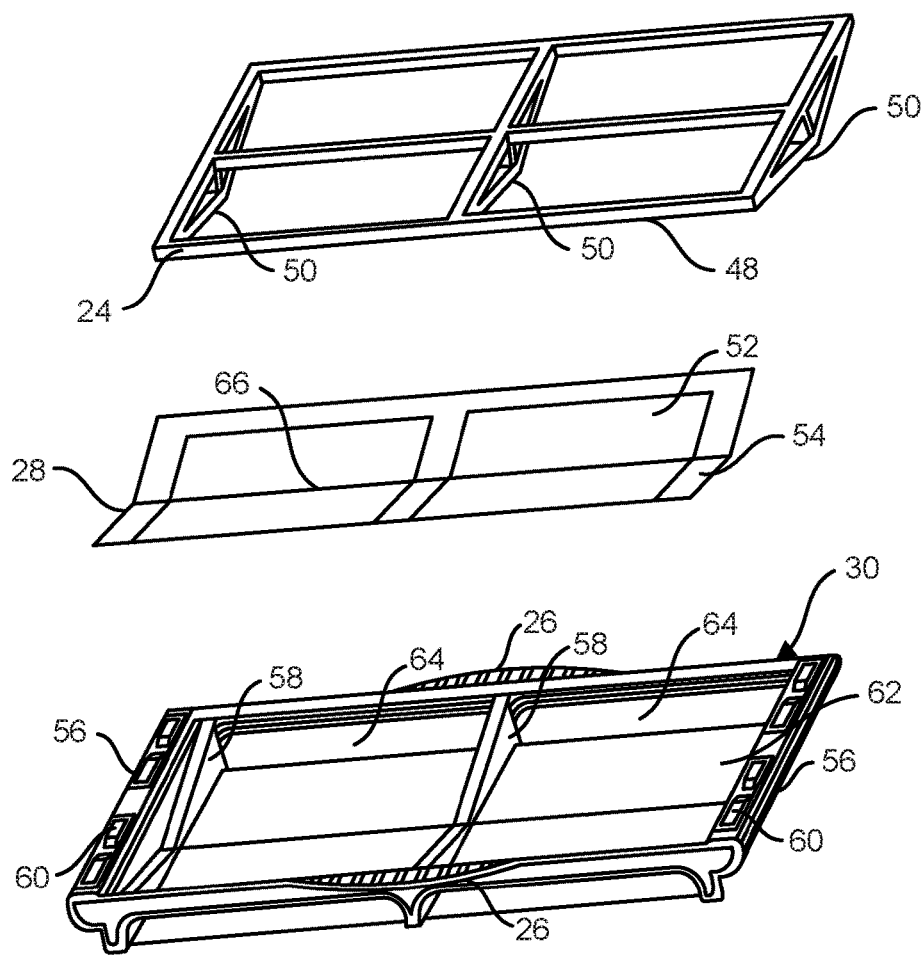
FIG. 4 shows a perspective exploded view of a cartridge component of the insect monitor.
Figure 5:
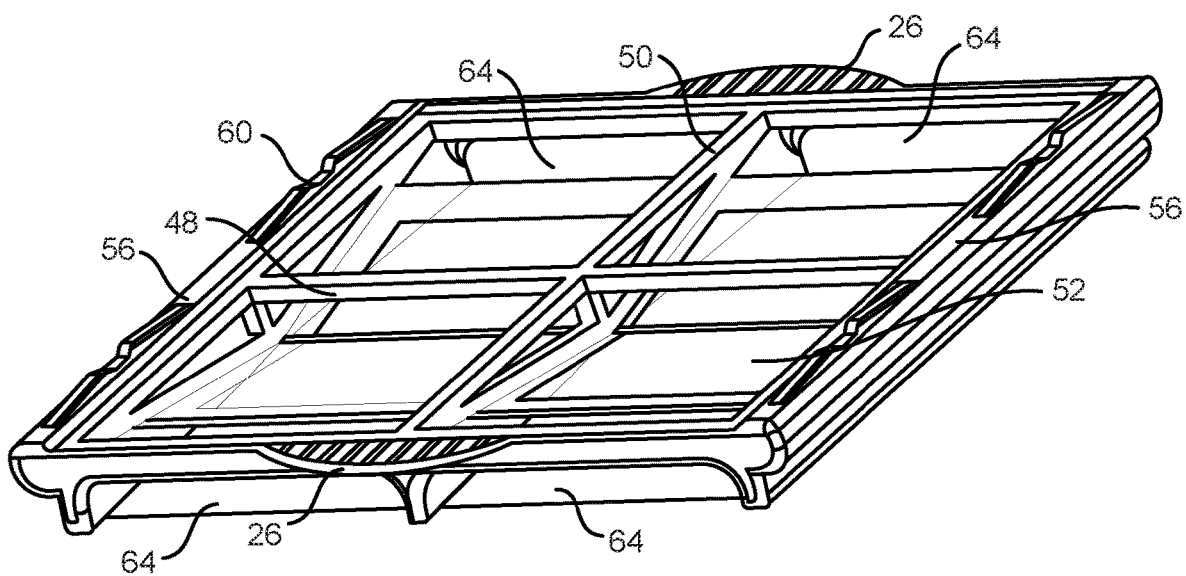
FIG. 5 shows a perspective view of an assembled cartridge assembly similar to that shown in FIG. 4.

Looking at FIGS. 1, 4 and 5 in combination, the structure and relative location of the tray assembly 30 is clearly shown. While the insect monitor is in use the tray assembly 30 is substantially within the body 11 with only the handles 26 protruding. The handles 26 provide a gripping surface an operator of the device may use to insert and remove the tray assembly 30 during maintenance and assembly.

The sheet assembly 28 is a consumable part of the insect monitor. The sheet assembly 28 may be replaced periodically as needed when it no longer is effective, wears out, becomes saturated with captured insects and related detritus or is otherwise unsuitable for continued use to capture insects in the monitoring process.

The sheet assembly 28 has a surface 52 that may include a sticky substance coating onto which insects entering the device and contacting the surface 52 are captured for observation. The surface 52 may alternatively or additionally include an attractant or lure such as chemical, pheromone or scent to encourage the insects to encounter and be captured onto the surface 52.

If included, the attractant or lure may be target specific. For example, if the insect monitor is looking for a particular type or species of insect then an adjunct especially for that target may be used. In the case of bed bugs, a specific pheromone may entice the bugs to enter, become trapped and then monitored. Ants, roaches, termites or any other type of insect could be specifically lured. A broad form attractant could also be used to draw into the device any insect existing in or around a particular target location to be monitored.

There is optionally a margin 54 around the surface 52 on the sheet assembly 28 that may be provided to be a grasping point to avoid human contact with the insects or coating on the surface 52 during installation and replacement of the sheet assembly 28. In this version the margin 54 would be clean and free of substances that would be unsafe or undesirable to touch the users hands.

A crease 66 may be included in the sheet assembly 28 to fit it against the bottom 62 or supports 58 of the tray assembly 30. By depressing or lowering the central crease 66 of the sheet assembly 28 the insects can tend to fall further into the insect monitor and avoid escape and be positioned more directly under the sensor array 82 for more efficient monitoring of the captured insects.

The substrate of the sheet assembly 28 is preferably able to support the material applied to the surface for the duration of a monitoring period. The environmental exposure of the device should also be considered when selecting the substrate material. In some application there may be variations of temperature, moisture or humidity, air currents or light that could affect the performance of the device. For typical applications the substrate may be paper, cardboard or plastic with allowance for the support of the sticky or other materials on the surface 52 of the sheet assembly 28.

The frame assembly 24 fits into the tray assembly 30 to hold the sheet assembly 28 securely. The sheet assembly 28 is held between the frame assembly 24 and the primary element of the tray assembly 30. When the tray assembly 30 is inserted into the body 11 the frame assembly 24 is fully captured and holds the sheet assembly 28 firmly in place so it does not move when the insect monitor is placed in either a vertical or horizontal orientation.

The frame assembly 24 is comprised of a series of trusses 50 connected by a frame 48. The trusses 50 are provided in a triangular shape with the peak positioned to match the crease 66 on the sheet assembly 28. With this feature the frame assembly 24 can hold the sheet assembly in proper orientation and firmly in the tray assembly 30 when inserted into the body 11.

The assembled tray assembly 30 includes apertures 64 through which any insects may enter the insect monitoring device for capture and monitoring. When an insect enters the tray assembly 30 it is immediately and permanently adhered to the surface 52.

The tray assembly 30 may have clips 60 on the rails 56 that engage into the tracks 22 on the body 11 to frictionally fit the tray assembly 30 securely into the insect monitoring device. The clip 60 provides some resistance to a freely moving tray assembly 30 so that the monitoring device may be place on a vertical or horizontal surface without risk of inadvertently dislodging the tray assembly 30 and exposing the contents of the interior.

Figure 6:
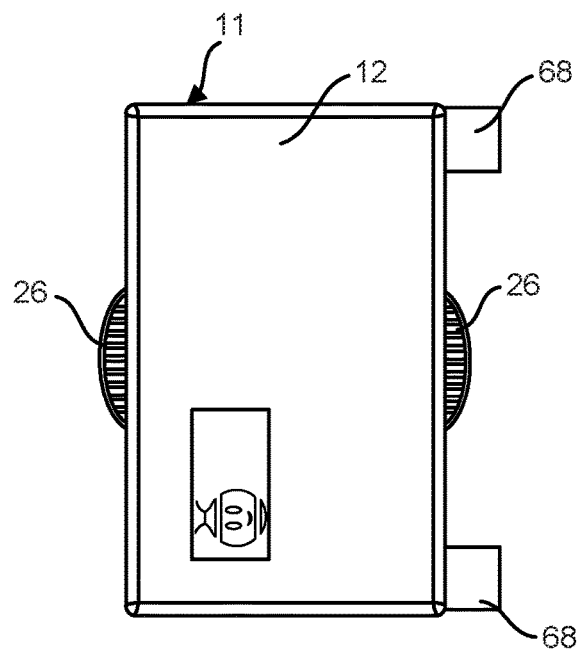
FIG. 6 shows a plan view of an insect monitor with cartridge inserted.
Figure 7:
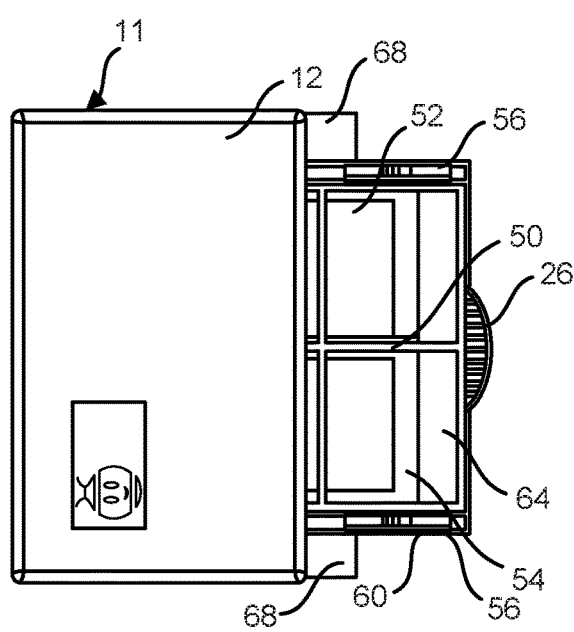
FIG. 7 shows a plan view of an insect monitor with the cartridge partially removed.

Looking now at FIGS. 6 and 7 where the insect monitoring device is shown with the tray assembly 30 inserted and partially withdrawn, respectively. FIG. 6, with the tray assembly fully inserted, is configured as the device may be in normal operation. FIG. 7 shows how the monitoring device may be during the process of inserting or removing the tray assembly 30.

With the tracks 22 that completely traverse the underside of the body 11, the tray assembly 30 may be inserted or removed from either side of the body 11. This feature may be useful when the feet 46 are adhered to a mounting substrate and access to one side of the device is limited due to proximity to obstructions. Handles 26 may be provided on both sides of the tray assembly 30 to support this feature.

Figure 9:
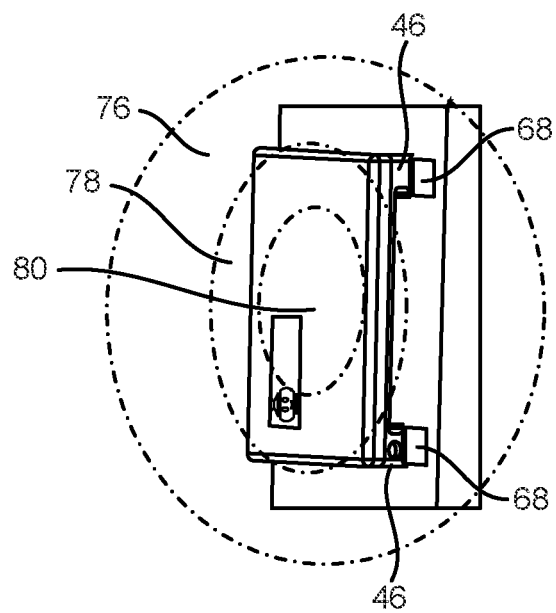
FIG. 9 shows a perspective view of an insect monitor in action with overlaying virtual proximity rings.

Also demonstrated in FIGS. 6, 7 and 9 are the adhesive strips 68 that are optionally provided to connect the feet 46 of the body 11 to a supporting surface, such as a wall or counter. The adhesive strips 68 may be comprised of a double sided pressure sensitive tape. Optionally, the adhesive strips 68 may be removable by including a hook and loop fastener or other adhesive feature that can be secured and later removed for relocating the device or for maintenance and replacement of the sheet assembly 28.

FIG. 9 shows an example of the insect monitor attached to a wall and without the tray assembly 30 inserted. The configuration of the barrier assembly 14 in combination with the electrical controller of the heating element 36 and other structural components of the device result in a predetermined core temperature in zone 80 and stabilized temperatures in zones 76 and 78.

For example, it has been determined to be effective for a sixty degree Fahrenheit ambient environment when the tray assembly 30 is removed to have zone 80 on the bottom of the device at about between one hundred twenty and one hundred forty degrees and about between one hundred and one hundred ten degrees on the top of the cover 12. With the tray assembly 30 inserted the bottom side and top side of the device in zone 80 and 78 should be between about one hundred and one hundred ten degrees.

Outside of zone 78 in zone 76 the temperature should remain below about one hundred degrees. This avoid the dangers of injury to people and pets and damage to property. The temperature may be thermostatically controlled by the sensor array 82 or other controlling electronics of the device.

The above measurements are guidelines for one particular version of the insect monitor device including specific materials, dimensions and included optional components adapted for a specific insect. It is provided as an enabling guideline. Routine and ordinary adjustments and testing will readily reveal adjustments and suitability for a particular application and target insect.

Figure 10:
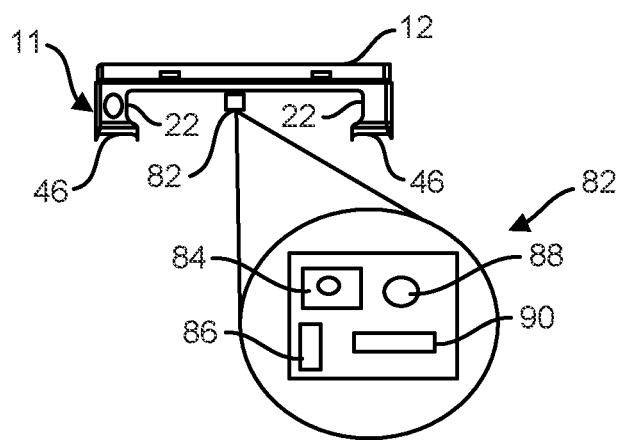
FIG. 10 shows an elevation view of in insect trap without the cartridge assembly and a detail of the sensor array.

Turning to FIG. 10 where instruments are shown in the sensor array 82 that enhance the utility of the insect monitor device. Attached to the insect monitor may be provided a sensor array that contains any or all of the components shown in FIG. 10 and described herein. The sensor array 82 generally requires power that may be provided with the power source for the heating element 36.

The sensor array 82 is positioned inside the body 11 and is directed toward the sheet assembly 28 so that any insects on the surface 52 or entering the body through the apertures 64 are picked up and recorded by the sensor array 82 and broadcast wirelessly to a network by the antenna 90 where further transmission, processing and review of the data collected by the sensors in the sensor array 82.

The sensor array 82 may provide controlled power to the heating element 36 to provide more precise control. The heating element 36 itself may include a temperature sensor that aids in precise controlling of the heat produced by the device. This can compensate for different and changing ambient temperature as well as environmental factors such as humidity and drafts that can affect the heat retention properties of the device to help ensure that the temperature of the insect monitor remains in an effective range.

The sensor array 82 should be directed toward the tray assembly 30 to aid in sensing changes to the tray assembly 30. A camera 84 provides a visual reference to what has entered the insect monitor. The camera 84 can help identify the specific insect in the monitor as well as the time the insect entered the monitor. This can be helpful in determining the rate of insect infestation.

The camera 84 may be a low light capable optical sensing device. Optionally, a light may be provided that is directed toward the imaging surface 52 where any insects are expected to be encountered. The camera 84 may use imaging technology other than optical light gathering, such as infra red (IR), ultrasound, thermal imaging or any other imaging technology that can identify physical characteristics of an insect in the monitoring device to aid in establishing the presence of the insect and identifying the specific type, size, nature and numbers of insects entering or captured in the monitoring device.

A vibration detector 86 may be included in the sensor array 82. This can alert the device that insects are on or are entering the insect sensor. The vibration detector can be used in combination with the other sensors to develop a greater set of data about the nature of the individual or groups of insects.

A chemical detector 88 may optionally be present in the sensor array 82. The detector 88 can determine the nature or concentration of a predefined group of elements or compounds useful for detection of a target type of insect. For example, carbon dioxide can indicate the presence of carbon dioxide consuming or producing insects.

Types of detectors 88 could include, for example, nanosensor such as capacitance or resistance varying sensor or other type of generally non-consumed sensor that can detect the presence of selected substances. The detectors 88 could detect gasses, biological or other things. The sensors 88 could be any commercially available sensor or testing electronic apparatus connectable to the sensor array 82.

An image captured on the camera 84 may be wireless transferred to a network device via the antenna 90. That image, or any other data generated by the sensor array 82, may be delivered to an owner of the device or to a remote service that aids the owner to monitor the insect monitor and help to provide assistance and direction for insect infestation remediation.

The camera 84 may be used as a motion detector to alert when there are changes to the inside of the device. For example, the camera 84 may take a baseline image and if a predetermined number of pixels change over a set amount of time then a preset action could commence. For example, when activity is detected in the device the other elements of the sensor array 82 could begin to operate. This could save energy, for example, by only operating the wireless antenna 90 or other circuitry when there is activity in the device.

The data collected by the components of the sensor array 82 may sent through the antenna 90 to a computer network, such as a wi-fi or cellular network, to remotely deliver the collected information. Any type of wireless connection or network could be used effectively to get the information from the sensor array 82 to another device or user where that information could be useful.

A computer or phone software application may be provided to receive information generated by the sensor array 82 components and record and compute that information into data that can be used by an operator of the device.

The software may alert a user when the device needs maintenance. For example, the trap is full of insects and needs another sheet assembly 28 or that there is activity in the trap and action should be taken to avert an infestation. The software may help a user identify the type of insect in the trap and suggest a course of remediation at an early stage to avoid a larger problem of an increasing insect population.

The software may be operated and accessed by the operator of the device or there may be remote deliver of the information to a remote monitoring service. A remote professional monitoring service may be better adapted to continually monitor locations. A remote service may have experts available to evaluate information provided by the device and make recommendations better than software.

A version of the invention can be fairly described as an insect monitor comprised of a body, a heating element, a barrier assembly and a tray assembly. A sheet assembly on a lower surface is affixed to an upper surface of the tray assembly. The sheet assembly may be clipped in, set on or otherwise connected to the tray assembly. The sheet assembly or the whole tray assembly is replaceable when full of insects. An upper surface of the sheet assembly is covered with an adhesive adapted to permanently adhere an insect when the insect encounters the sticky surface. The sheet assembly is removable from the tray assembly or may be a part of the tray assembly and replaced as a unit with the tray assembly. The tray assembly includes an aperture adjacent to the sheet assembly that dimensioned to permit the passage of the insect toward the adhesive. This is essentially the portal through which an insect enters the monitor immediately prior to being captured on the adhesive. The tray assembly connects into a base of the body and holds the adhesive on the sheet assembly facing the heating element in the body. The tray assembly may slide into, clip into, be magnetized onto or other means of connection that permits replacement of the sticky pad. The heating element is between the sheet assembly and the barrier assembly and warms the interior of the trap to attract insects and soften the sticky pad. The barrier assembly is planar and comprises a reflector layer on a first side facing the heating element and an insulator layer on a second side of the barrier assembly opposite of the heating element. The heating element is electrically powered. Affixed to the insect monitor is a sensor array that includes at least a camera and an antenna. The camera is directed toward the sheet assembly and images the insect captured on or positioned near the sheet assembly. The antenna transmits an image of the insect to a remote computer. The insect monitor may optionally also include on the sensor array a vibration detector that transmits a first information to the remote computer when a vibration is sensed. This may be triggered when insects vibrate or move but cannot be seen with the camera. The sensor array may also include chemical detector that transmits a second information to the remote computer when a chemical is detected, for example it could detect carbon monoxide. The information garnered by the sensor array optionally can be sent to a remote computer is operated by a commercial monitoring service. The remote service can help identify bugs that the trap captures and may provide an alert and suggestions for remediation.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An insect monitor comprised of a body, a heating element, a barrier assembly and a tray assembly;
    a sheet assembly having a lower surface that is affixed to an upper surface of the tray assembly;
    an upper surface of the sheet assembly is covered with an adhesive adapted to permanently adhere an insect;
    the sheet assembly is removable from the tray assembly;
    the tray assembly includes an aperture adjacent to the sheet assembly that is dimensioned to permit the passage of the insect toward the adhesive;

the tray assembly connects into a base of the body and holds the adhesive on the sheet assembly facing the heating element in the body;

the heating element is positioned between the sheet assembly and the barrier assembly;

the barrier assembly is planar and comprises a reflector layer on a first side facing the heating element and an insulator layer on a second side of the barrier assembly opposite of the heating element;

the heating element is electrically powered;

affixed to the body is a sensor array that includes a camera and an antenna;

the camera is directed toward the sheet assembly and images the insect on the sheet assembly;

the antenna transmits an image of the insect to a remote computer.

2. The insect monitor of claim 1 further characterized in that the sensor array also includes a vibration detector that transmits a first information to the remote computer when a vibration is sensed.

3. The insect monitor of claim 1 further characterized in that the sensor array also includes a chemical detector that transmits a second information to the remote computer when a chemical is detected.

4. The insect monitor of claim 3 further characterized in that the chemical detector is adapted to detect carbon dioxide.

5. The insect monitor of claim 1 further characterized in that the remote computer is operated by a commercial monitoring service.

\* \* \* \* \*